United States Patent
Savioz (10) Patent No.: US 11,419,449 B2
(45) Date of Patent: Aug. 23, 2022

(54) DEVICE FOR PRODUCING MILK AND/OR MILK FOAM AND ASSOCIATED SYSTEM

(71) Applicant: SOCIETE DES PRODUITS NESTLE S.A., Vevey (CH)

(72) Inventor: Gregory Savioz, Saxonne (CH)

(73) Assignee: Societe des Produits Nestle S.A., Vevey (CH)

(*) Notice: Subject to any disclaimer, the term of this patent is extended or adjusted under 35 U.S.C. 154(b) by 259 days.

(21) Appl. No.: 16/769,731

(22) PCT Filed: Dec. 5, 2018

(86) PCT No.: PCT/EP2018/083681
§ 371 (c)(1),
(2) Date: Jun. 4, 2020

(87) PCT Pub. No.: WO2019/110678
PCT Pub. Date: Jun. 13, 2019

(65) Prior Publication Data
US 2020/0367688 A1    Nov. 26, 2020

(30) Foreign Application Priority Data
Dec. 8, 2017 (EP) .................................. 17206107

(51) Int. Cl.
*A47J 31/52* (2006.01)

(52) U.S. Cl.
CPC ......... *A47J 31/521* (2018.08); *A47J 31/5253* (2018.08); *A47J 31/5255* (2018.08); *A47J 2201/00* (2013.01)

(58) Field of Classification Search
CPC ................................ A47J 31/52; A47J 31/521
(Continued)

(56) References Cited

U.S. PATENT DOCUMENTS

2011/0070340 A1   3/2011   Pechaigner et al.
2013/0115343 A1   5/2013   Reyhanloo
(Continued)

FOREIGN PATENT DOCUMENTS

CN    202408514 U    9/2012
CN    103027591 A    4/2013
(Continued)

*Primary Examiner* — Toan C Ly
(74) *Attorney, Agent, or Firm* — K&L Gates LLP (57) ABSTRACT

The invention relates to a device (10) for producing milk and/or milk foam able to be used as a standalone device or used wirelessly connected to a beverage preparation machine (20); the device (10) controls the characteristics of the milk and/or milk foam desired, when this device (10) is used as a standalone device; the device drives the beverage preparation machine (20) when connected to it wirelessly, for the preparation and dispensing of beverage recipes prepared in conjunction with this beverage preparation machine (20), managing sequences for arriving to a desired beverage recipe. The invention further relates to a system comprising a device (10) for producing milk and/or milk foam as described, and a beverage preparation machine, the device (10) being wirelessly connectable to the beverage preparation machine, the user selecting a recipe in the device (10) and, depending on the recipe selected, the device (10) works as standalone and produces the said recipe or it drives the beverage preparation machine managing sequences for arriving to a beverage recipe as provided by the user's input. Furthermore, the invention relates to a method for operating a system as the one described, in order to prepare a beverage or beverage recipe.

14 Claims, 5 Drawing Sheets

(58) Field of Classification Search
USPC .......................................................... 426/231
See application file for complete search history.

(56) References Cited

U.S. PATENT DOCUMENTS

| | | | |
|---|---|---|---|
| 2013/0276636 | A1 | 10/2013 | Rithener et al. |
| 2015/0305551 | A1* | 10/2015 | Rosati ..................... A47J 31/56 |
| | | | 99/280 |
| 2016/0235243 | A1 | 8/2016 | Grassia et al. |
| 2017/0303735 | A1* | 10/2017 | Balkau ................ A47J 31/4489 |
| 2019/0307287 | A1* | 10/2019 | Magatti ............... A47J 31/5253 |

FOREIGN PATENT DOCUMENTS

| | | |
|---|---|---|
| CN | 106125579 A | 11/2016 |
| CN | 106970545 A | 7/2017 |
| EP | 0600826 | 6/1994 |
| EP | 0761150 | 3/1997 |
| EP | 1864598 | 12/2007 |
| WO | 2012055767 | 5/2012 |
| WO | 2015135031 A1 | 9/2015 |
| WO | 2017144825 | 8/2017 |

* cited by examiner

Recipe A:

| Type | (Foam, Milk, Cofee) |
|---|---|
| Motor speed [rpm] | (0 – 5000) |
| Motor time [s] | (0 – X) |
| Temperature [°C] | (0 – 80) |
| Air valve duty cycle [%] | (0 – 100) |
| Coffee type | (None, Ristretto, Expresso, Lungo) |

FIG. 5A

Sequence 1

| Type | (Foam, Milk, Cofee) |
|---|---|
| Motor speed [rpm] | (0 – 5000) |
| Motor time [s] | (0 – X) |
| Temperature [°C] | (0 – 80) |
| Air valve duty cycle [%] | (0 – 100) |
| Coffee type | (None, Ristretto, Expresso, Lungo) |

Sequence 2

| Type | (Foam, Milk, Cofee) |
|---|---|
| Motor speed [rpm] | (0 – 5000) |
| Motor time [s] | (0 – X) |
| Temperature [°C] | (0 – 80) |
| Air valve duty cycle [%] | (0 – 100) |
| Coffee type | (None, Ristretto, Expresso, Lungo) |

...

Sequence N

| Type | (Foam, Milk, Cofee) |
|---|---|
| Motor speed [rpm] | (0 – 5000) |
| Motor time [s] | (0 – X) |
| Temperature [°C] | (0 – 80) |
| Air valve duty cycle [%] | (0 – 100) |
| Coffee type | (None, Ristretto, Expresso, Lungo) |

FIG. 5B

Standalone recipes (milk only)

Liquid ~12

| Type | Milk |
|---|---|
| Motor speed [rpm] | 3000 |
| Motor time [s] | 60 |
| Temperature [°C] | 70 |
| Air valve duty cycle [%] | 100 |
| Coffee type | None |

Light foam ~13

| Type | Milk |
|---|---|
| Motor speed [rpm] | 4000 |
| Motor time [s] | 60 |
| Temperature [°C] | 70 |
| Air valve duty cycle [%] | 10 |
| Coffee type | None |

Dense foam ~14

| Type | Milk |
|---|---|
| Motor speed [rpm] | 4500 |
| Motor time [s] | 60 |
| Temperature [°C] | 70 |
| Air valve duty cycle [%] | 0 |
| Coffee type | None |

FIG. 6

Coffee recipes (accessory + coffee machine)

Latte — 12'

| Type | Foam | Type | Milk |
|---|---|---|---|
| Time [s] | 5 | Time [s] | 25 |
| Coffee type | None | Coffee type | Expresso* |

Cappuccino — 13'

| Type | Foam | Type | Coffee |
|---|---|---|---|
| Time [s] | 20 | Time [s] | - |
| Coffee type | None | Coffee type | Expresso* |

Latte Macchiato — 14'

| Type | Foam | Type | Milk | Type | Coffee |
|---|---|---|---|---|---|
| Time [s] | 20 | Time [s] | 20 | Time [s] | - |
| Coffee type | None | Coffee type | None | Coffee type | Lungo* |

FIG. 7

DEVICE FOR PRODUCING MILK AND/OR MILK FOAM AND ASSOCIATED SYSTEM

CROSS REFERENCE TO RELATED APPLICATIONS

The present application is a National Stage of International Application No. PCT/EP2018/083681, filed on Dec. 5, 2018, which claims priority to European Patent Application No. 17206107.9, filed on Dec. 8, 2017, the entire contents of which are being incorporated herein by reference.

FIELD OF THE INVENTION

The present invention is directed to a device for producing milk and/or milk foam that can be used as a standalone device or connected to a beverage preparation machine, typically to a coffee machine. The invention further relates to a system comprising such a device and to a method to operate such a system.

BACKGROUND OF THE INVENTION

At present, there exist devices for producing milk or milk foam that are sold together with coffee machines, but they do not allow the preparation of complete recipes in an easy way, desirably by the touch of a button, rather requiring several manipulations of the user on several devices.

In many cases, coffee machines are provided with embedded milk foaming technology, such as Venturi technology, that makes these machines be very bulky. Moreover, people who want to have just coffee do not need such a bulky and complex machine and, similarly, people who just want milk or milk foam do not either want such a machine.

There also exist devices that prepare milk and/or milk foam, and that can be connected to coffee machines in order to prepare a beverage such as cappuccino, latte macchiato, etc. However, these existing milk or milk foaming accessories are completely separated from the coffee machines and need to be used separately or sequentially in order to prepare a beverage. This makes the process unfriendly for the user and also the quality of the beverage prepared is not always optimal.

Therefore, it would be desirable to provide a device that produces milk and/or milk foam and that does not have the drawbacks of the devices known in the prior art. The present invention therefore comes to provide a milk and/or milk foaming device able to be connected to a beverage preparation machine or to be used as a standalone device that can easily provide recipes at the touch of a button when working connected to a preparation machine or that can be used as standalone device providing milk or milk foam of certain characteristics, as desired by the user.

The present invention comes to provide a solution to these needs.

SUMMARY OF THE INVENTION

According to a first aspect, the invention relates to a device for producing milk and/or milk foam able to be used as a standalone device or used wirelessly connected to a beverage preparation machine: the device controls the characteristics of the milk and/or milk foam desired, when this device is used as a standalone device; the device drives the beverage preparation machine when it is connected to it wirelessly, for the preparation and dispensing of beverage recipes which are prepared in conjunction with this beverage preparation machine, managing sequences for arriving to a desired beverage recipe.

When the device of the invention is used as a standalone device, it preferably controls at least one of the following parameters: temperature and/or density and/or flow of the milk foam; temperature and/or flow of the milk.

Typically, the device according to the invention is configured connectable to a wireless apparatus, such as a smartphone or a tablet: the device is configured to receive the user's input from the wireless apparatus and to send it information, such as on its status.

Preferably, in the device of the invention, the user's input information provided to the wireless apparatus comprises recipe information and/or recipe parameters and/or start/stop information.

In the device according to the present invention, the user can typically choose one-touch recipes.

According to a second aspect, the invention relates to a system comprising a device for producing milk and/or milk foam as the one previously described and a beverage preparation machine: the device is wirelessly connectable to the beverage preparation machine; the user selects a recipe in the said device and, depending on the recipe selected, the device works as standalone and produces the said recipe or it drives the beverage preparation machine managing sequences for arriving to a beverage recipe as provided by the user's input.

Preferably, in the system of the invention, the device drives the beverage preparation machine to work sequentially or simultaneously, depending on the recipe selected by the user.

Typically, in the system according to the present invention, the device and the beverage preparation machine are connectable by Wi-Fi and/or by Bluetooth. Preferably, the device and/or the beverage preparation machine are further connectable to a wireless apparatus by Wi-Fi and/or by Bluetooth, typically to start or stop the preparation of the beverage and/or the milk and/or the milk foam, for notifications as to the managing of the recipe or as to certain alerts such as for example when the water tank in the beverage preparation machine is empty, and also for example to set a time to prepare the beverage or to make the recipe, etc.

In the system of the invention, the user's input is preferably provided by the wireless apparatus to the device and the device drives the beverage preparation machine for arriving to a beverage recipe as provided by the user's input.

Typically, in the system according to the present invention, the beverage preparation machine is a coffee machine.

According to yet another aspect, the invention relates to a method for operating a system as the one described, in order to prepare a beverage, the method comprising the steps of:

the device checks if there is a beverage preparation machine in the surroundings: if there is one, the device connects to the beverage preparation machine and activates both standalone and multiple-ingredients recipes; if there is no beverage preparation machine, then only standalone recipes are activated;

the user selects a recipe from the allowable activated ones on the device;

the device checks if the recipe is a standalone recipe or not;

if the recipe is a standalone one, the device produces milk and/or milk foam according to the user's input;

if the recipe is a multiple-ingredients recipe, the device drives the beverage preparation machine according to certain sequences in order to arrive to the selected beverage recipe.

In the method according to the invention, the device preferably drives the beverage preparation machine to work sequentially or simultaneously, depending on the recipe selected by the user on the device.

Typically, in the method of the invention, the device receives information on the user's input by means of a wireless apparatus to which the device is wirelessly connected.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1:
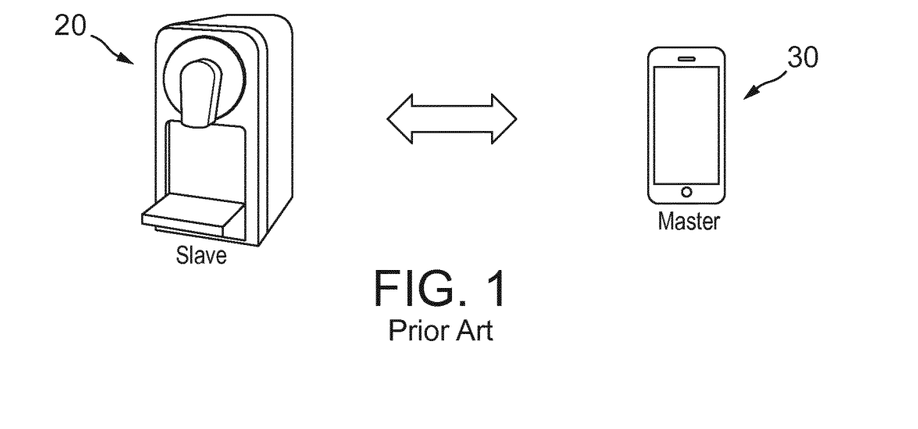
FIG. 1 shows a beverage preparation machine commanded by a wireless apparatus according to the known prior art.

The present invention relates to a device 10 producing milk and/or milk foam, this device 10 being connectable to a beverage preparation machine 20, typically to a coffee machine. The device 10 of the invention is preferably also configurable to provide hot or cold milk and/or milk foam, depending on the user's selection. As shown in FIG. 1, known beverage preparation machines 20 in the prior art are connectable to a wireless apparatus 30: in this case shown in FIG. 1, the wireless apparatus 30 acts as the master, instructing and driving the beverage preparation machine 20, which acts as a slave apparatus, receiving the commands and instructions from the wireless apparatus 30. The apparatus 30 connects to the coffee machine 20 and instructs this machine to start preparing coffee, for example, or to stop preparing it. The coffee machine 20 can also connect to the wireless apparatus 30 and provide status information, such as for example, indicate that the water tank is empty, or highlight a certain malfunctioning of a part or component of the machine 20, so the user is made aware of this information.

Figure 2:
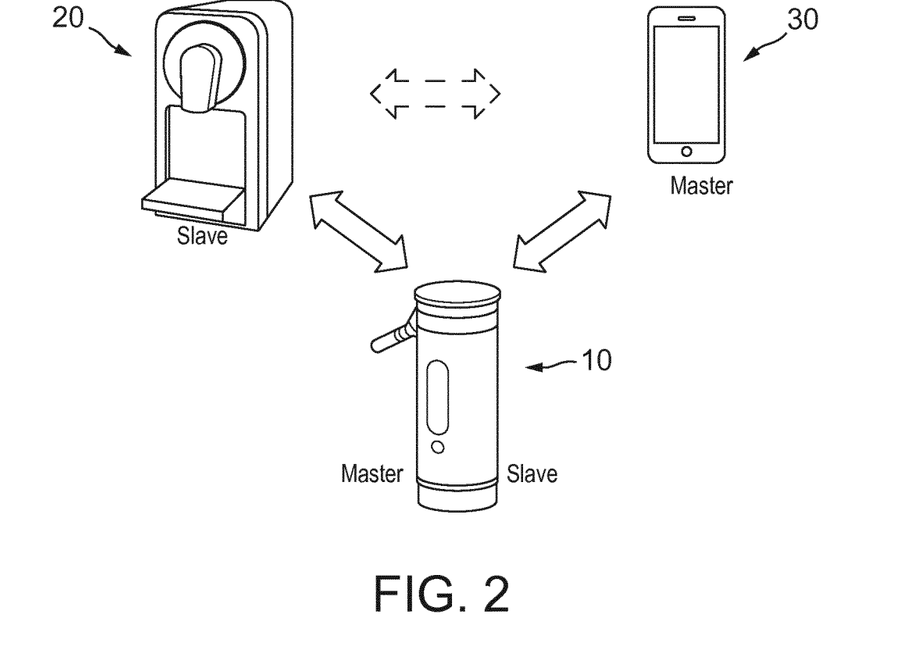
FIG. 2 shows a device for producing milk and/or milk foam according to the present invention connectable to a beverage preparation machine and to a wireless apparatus.

Looking now at FIG. 2, the device 10 of the invention is connectable to a beverage preparation machine 20, typically a coffee machine. In the configuration according to the invention, it is now the device 10 the one acting as master and providing instructions to the coffee machine 20, such as for example to start the preparation of coffee or to stop that preparation: in this case, the beverage preparation machine 20 acts as slave while the device 10 is now acting as the master, driving and instructing the machine 20. The beverage preparation machine 20 provides information to the device 10 such as for example when the coffee is ready. The device 10 for preparing milk and/or milk foam according to the invention is also connectable to a wireless apparatus 30, as schematically represented in FIG. 2. In this case, the wireless apparatus 30, typically a smartphone or a tablet, provides the device 10 with instructions such as the definition of the beverage recipe to prepare, the characteristics desired for that beverage, or for example when the recipe has to be started and/or stopped, i.e. the information coming from the user. The device 10 also communicates with the apparatus 30: typically, this communication comprises information on the status of the device, if the device has an error or malfunctioning, in order to make the user aware of it, or for example also communicates information on the status of the recipes, so the user is timely informed on the development of the beverage or recipe ordered. It is also possible that the apparatus 30 communicates with the beverage preparation machine 20 as represented in a dotted arrow in FIG. 2. In this case, the apparatus 30 acts as master and the coffee machine 20 as slave: the information sent can refer to the start or stop of preparation of the coffee in the machine 20, notifications sent by the machine 20 to the apparatus 30 when the water tank is empty or for example about to be empty, or for example from the apparatus 30 to the coffee machine 20 to set a certain time for starting the preparation of coffee or to have the coffee ready.

As schematically represented in FIG. 2, when the device 10 communicates with the coffee machine 20, it acts as master while the machine 20 acts as slave. When the apparatus 30 communicates with the device 10, it is the apparatus 30 the one acting as master and the device 10 takes the role of slave. When it is the apparatus 30 the one communicating with the coffee machine 20, the machine 20 is slave while the wireless apparatus 30 acts as master.

Typically, the wireless communication of the apparatus 30 with the beverage preparation machine 20 and with the device 10 is done by Bluetooth or Wi Fi.

As described earlier, the device 10 of the invention can prepare milk and/or milk foam, and is also able to provide hot milk and/or milk foam. The device 10 can either be used as a standalone device or it can be used connected and in combination with a beverage preparation machine 20. In both cases, the device 10 can also be connected to a wireless apparatus 30, such as a phone or a tablet.

Figure 3:
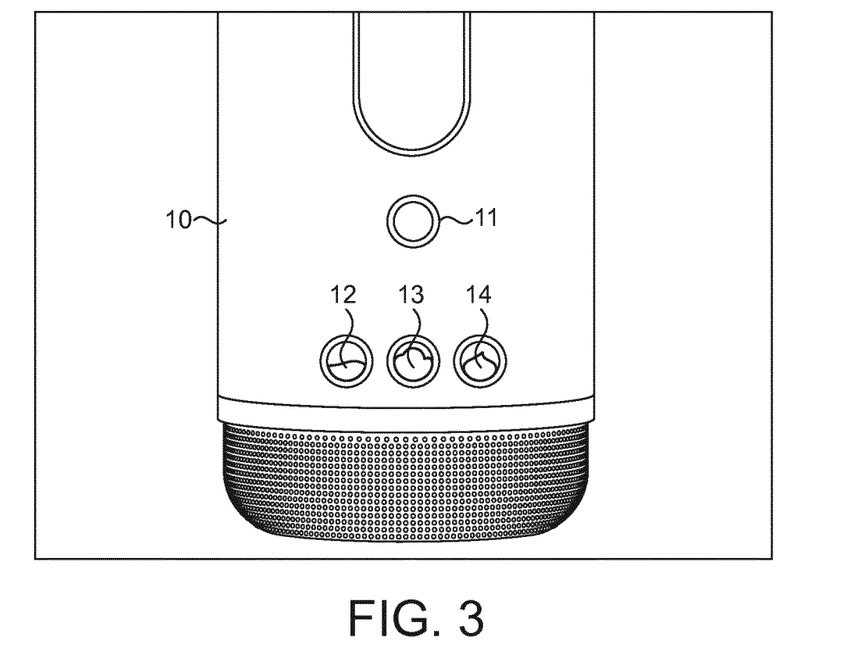
FIG. 3 shows a device for producing milk and/or milk foam according to the present invention when used as standalone device, showing different possibilities of preparation provided by the said device.

FIG. 3 shows the configuration of the device 10 of the invention when used as a standalone device: when not connected to a preparation machine 20, the device offers different preparation possibilities, typically liquid (milk, hot or cold), light foam or dense foam. The liquid option is represented by the button 12, the light foam by button 13 and the dense foam by button 14. The on/off button is indicated by the reference 11 in FIG. 3. When the device 10 works as a standalone device, the preparation options offered are lightened up by buttons 12, 13, 14. When the device 10 works in combination with a beverage preparation machine 20, typically a coffee machine, the same buttons (or different ones) will then be lightened up but offering different preparation possibilities, as it will be explained in what follows. Also, it is possible according to another variant of the invention, to have available both types of recipes at one touch in the device, both standalone recipes (milk, milk foam) and combination recipes (latte, cappuccino, latte macchiato): in this case, there will be two rows of buttons in the device 10 (12, 13, 14 and 12', 13', 14', though not represented in the attached Figures) that will be selectable by a user.

When used as standalone device, one or more of the following parameters will at least be controlled: temperature, density or flow of the milk foam, temperature or flow of milk.

Figure 4:
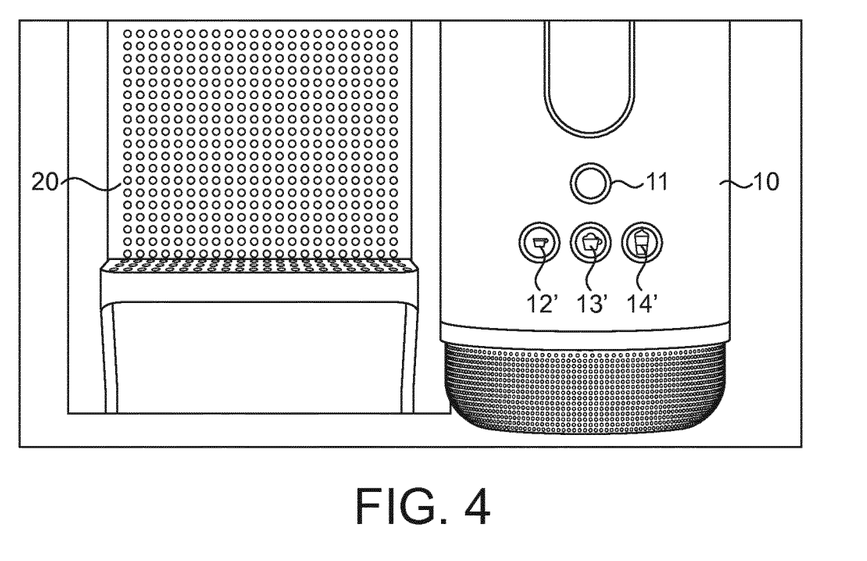
FIG. 4 shows a device for producing milk and/or milk foam according to the present invention when used connected to a beverage preparation machine, showing different possibilities of recipes that can be prepared using the said device together with the beverage machine.

When looking at FIG. 4, the device 10 detects that it is connected to a beverage preparation machine 20 and so switches to a master mode to get control of the full recipe (coffee and milk and foam). Different preparation options are now offered by the device, as schematically represented in FIG. 4, so the same (or different) buttons now lighten up different preparation options, such as the ones shown in FIG. 4: latte (button 12'), cappuccino (button 13') or latte macchiato (button 14'). The control over the full recipe prepared in combination with the machine 20 is taken over by the device 10.

As shown in any of FIG. 3 or 4, the device 10 becomes the master of the control of the recipes, typically offered as one-touch recipes.

Figure 6:
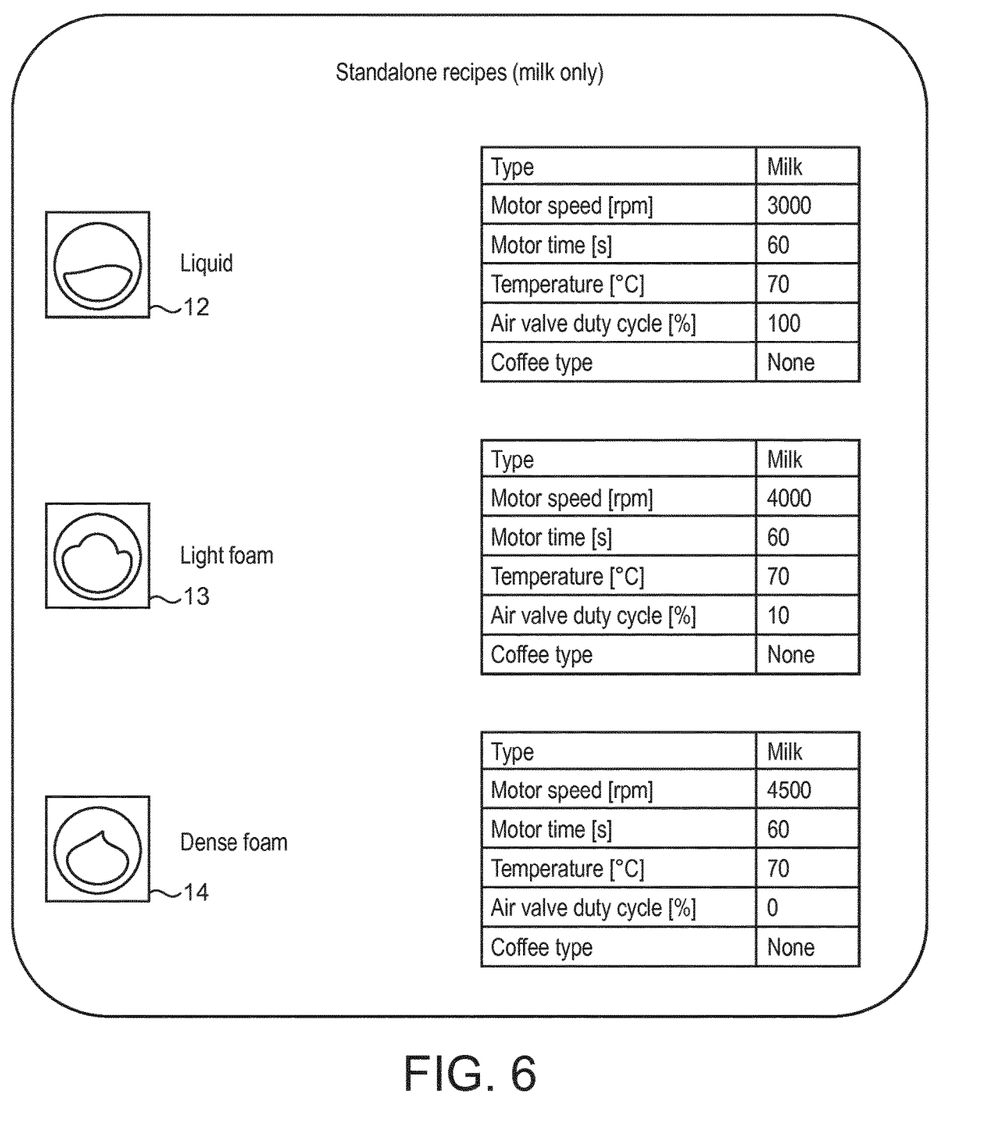
FIG. 6 shows three different typical standalone recipes that can be provided using the device for producing milk and/or milk foam according to the present invention.

FIG. 6 exemplifies the different parameters applied in the device 10 for producing each of the preparations offered when used as standalone device: liquid (milk) with button 12, light foam with button 13 or dense foam with button 14. Parameters such as motor speed and time, temperature of the milk or foam provided and whether or not the air valve is opened and for how long, are activated and commanded in the device 10 depending on the recipe desired (milk, light foam, dense foam).

Figure 7:
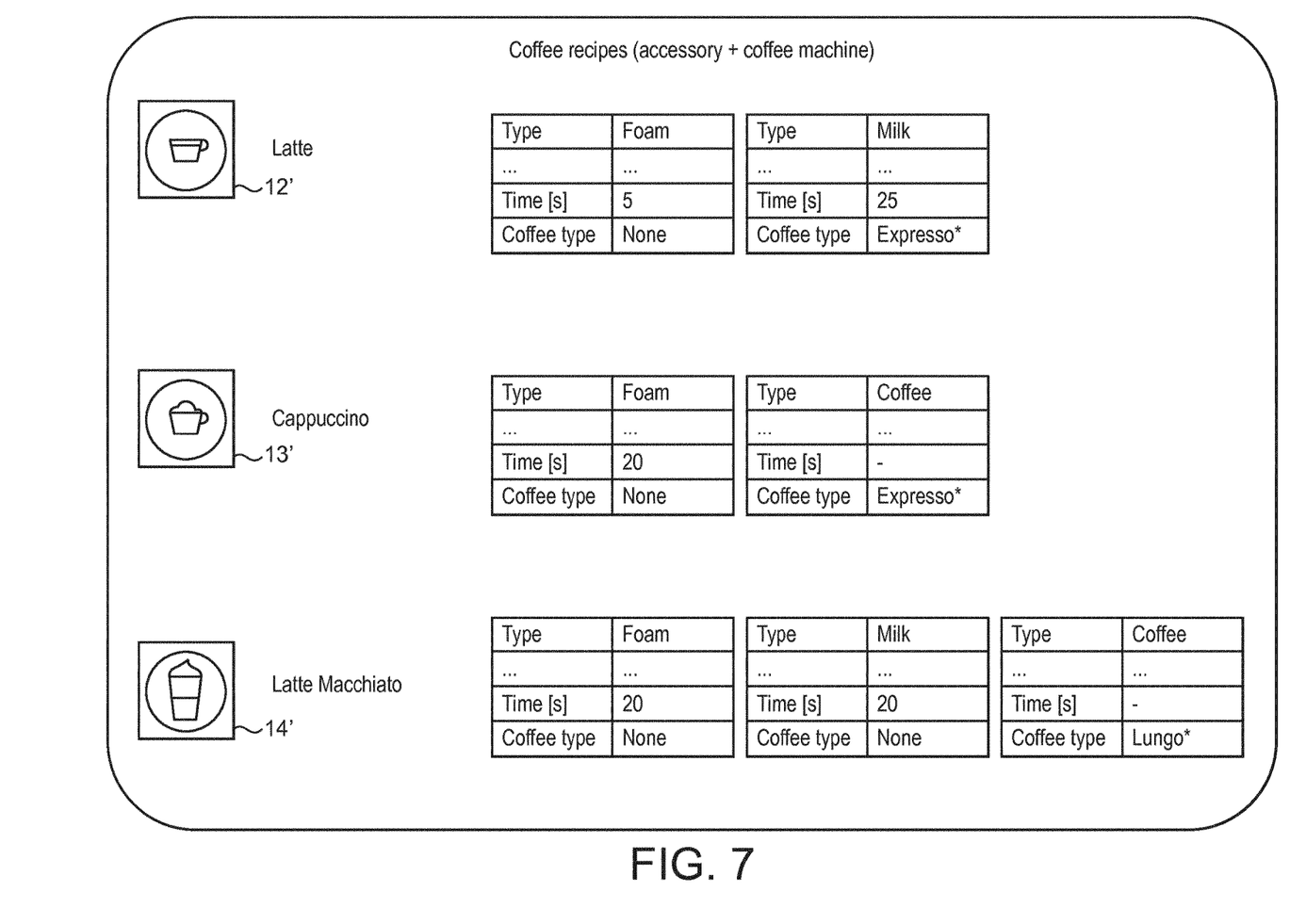
FIG. 7 shows three different typical recipes that can be provided using the device for producing milk and/or milk foam according to the present invention when used in combination with a beverage preparation machine, typically a coffee machine.

FIG. 7 exemplifies possible recipes that can be chosen when the device 10 works in combination with a coffee machine 20: for example, as discussed, latte (12'), cappuccino (13') or latte macchiato (14') can be provided at the touch of a button in the device 10. The device 10 will then act as master and will process itself the milk or milk foam part and will command the coffee part from the coffee machine 20: the combination of the beverages provided, the timings, the characteristics of these, etc. will all be commanded and mastered by the said device 10.

Figures 5A, 5B:
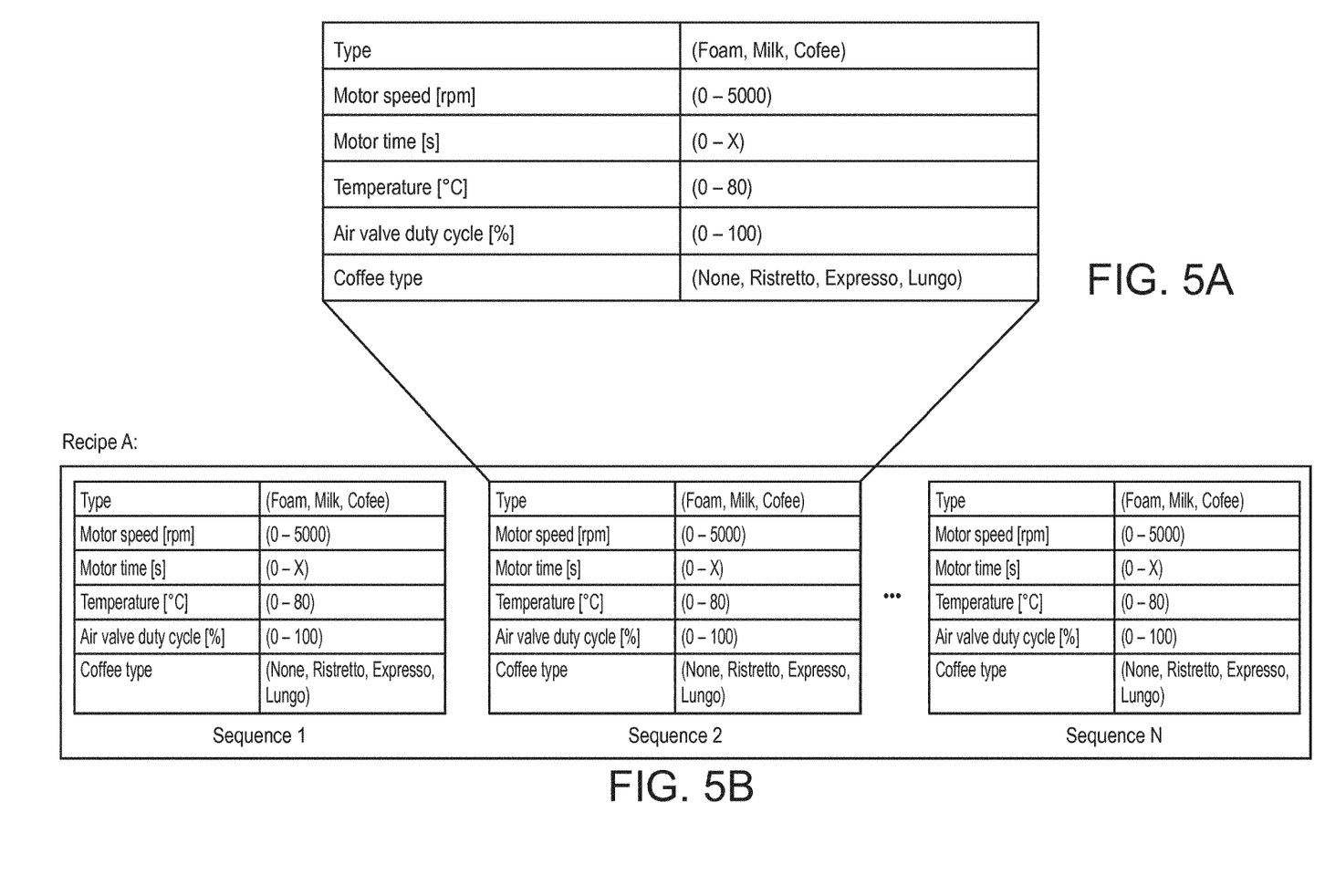
FIGS. 5a-b show different recipes or beverages that can be prepared with a device according to the present invention.

FIGS. 5a and 5b represent an example of a recipe that can be provided typically with the device 10 used in combination with a coffee machine 20, the recipe being prepared by several sequences applied, 1, 2, . . . N, as depicted in FIG. 5b.

As represented, a recipe is typically composed of one or several sequences for the types of foam, milk or coffee, each of these sequences including at least one or a combination of the following parameters:

Motor speed
Motor time
Temperature
Air valve duty cycle
Coffee type

This has been exemplified in FIG. 5a: FIG. 5b shows a recipe made with a 1, 2 and (n) of these sequences, each sequence being controlled by one or a combination of the above parameters.

Therefore, as explained, the present invention addresses a connected milk and/or milk foaming device that will enable to drive the coffee machine as well as the milk preparation so as to enable the preparation and delivery of sophisticated recipes at the touch of a button (e.g. Latte macchiato, Cappuccino, etc.). The idea is that the accessory (i.e. the device 10) becomes the master for the preparation when it is connected to the coffee machine 20. A triangle network is then created between the accessory (the device 10), the beverage preparation machine (coffee machine 20) and the user's phone (wireless apparatus 30).

The user is thus able to define his/her favourite recipes on his phone (wireless apparatus 30) and send them to the device 10, getting also some feedback. Then, the accessory (i.e. the device 10) becomes the main HMI (the master governing the preparation procedure) and one-touch recipes are launched from there. Coffee production is controlled directly from the accessory (from the device 10). One of the main advantages offered by the invention is that the coffee machine 20 remains unchanged (no additional/hidden HMI or connection has to be Embedded in the coffee machine; standard or known coffee machines can continue to be used with the device 10 as long as they have a wireless communication by Wi Fi or Bluetooth; thus, the only requirement is that the coffee machine can be connected to the user, which is already the case on the last generation of Bluetooth enabled coffee machines, for example.

In summary, some of the main advantages of the device of the invention are the following:

Sophisticated recipes are available at the touch of a button (such as latte, latte macchiato, cappuccino, etc.)

Whenever the existing coffee machine 20 is connectable by Wi Fi or Bluetooth, without any impact or change in this machine, the new device 10 of the invention can be connected to it in order to provide recipes, etc. without any extra cost nor the need of any redesign.

The connectivity between the device 10 and the machine 20 is simple, using Wi Fi or Bluetooth, allowing an easy and simple connection of the device 10 to the machine 20 just by bringing the device close to the machine.

Thanks to the device 10, there is provided full control on complex recipes, by controlling the delivery of coffee, milk and foam.

Superior micro foam being delivered

Adjustable foam density, by acting on the air entry through the adjustable air valve Simple architecture In-line system, direct to cup Embodiments allowing a very easy cleaning Possibility to deliver hot, cold or ambient preparations Machine module or accessory architectures are possible According to a second aspect, the invention further relates to a system comprising a device 10 for producing milk and/or milk foam and a beverage preparation machine 20, typically a coffee machine 20. Preferably, the user selects a recipe in the device 10 and, depending if the recipe is a standalone one (i.e. milk, milk foam provided) or if it is a recipe prepared in conjunction with the coffee machine, the device will prepare directly the milk or the foam only or will drive the coffee machine as required according to the recipe sequence needed to be carried out for the final beverage desired.

Yet according to a third aspect, the invention relates to a method for operating a device 10 or for operating a system comprising such a device 10 and a beverage preparation machine 20. When operating only a device 10 working as a standalone device, only certain possibilities will be offered to the consumer, as milk (hot or cold) or milk foam (light or dense, hot or cold). The consumer will be able to choose one of these directly in the device 10 (by pressing the corresponding button) or by selecting one of these in a wireless apparatus 30 (typically a phone or a table), sending this information to the device 10 that will then proceed to prepare it.

When the method operates a system, the system comprising a device 10 and a beverage machine 20 of the coffee machine type, then different recipes will be offered in the device 10, such as latte, latte macchiato or cappuccino: the consumer can directly select one of these in the device 10 (and then, the device will drive the coffee machine in the required sequence needed for such preparation) or he/she can choose the recipe in a wireless apparatus 30 (phone or tablet), from where it will be sent to the device 10 that will govern the functioning of the coffee machine 20 according to the sequence required for the preparation of the recipe chosen.

Although the present invention has been described with reference to preferred embodiments thereof, many modifications and alterations may be made by a person having ordinary skill in the art without departing from the scope of this invention which is defined by the appended claims.

The invention claimed is:

1. Device for producing milk and/or milk foam able to be used as a standalone device or used wirelessly connected to a beverage preparation machine;
   the device controlling the characteristics of the milk and/or milk foam desired, when this device is used as a standalone device; and
   the device driving the beverage preparation machine when connected to it wirelessly, for the preparation and dispensing of beverage recipes prepared in conjunction with this beverage preparation machine, managing sequences for arriving to a desired beverage recipe.

2. Device according to claim 1 wherein when used as a standalone device, it controls at least one of the following parameters: temperature, density, flow of the milk foams temperature and flow of the milk.

3. Device according to claim 1 configured connectable to a wireless apparatus, the device being configured to receive the user's input from the wireless apparatus and to send it information.

4. Device according to claim 3 wherein the user's input information provided to the wireless apparatus comprises recipe information and/or recipe parameters and/or start/stop information.

5. Device according to claim 1 wherein the user can choose one-touch recipes in the device.

6. System comprising a device for producing milk and/or milk foam able to be used as a standalone device or used wirelessly connected to a beverage preparation machine, the device controlling the characteristics of the milk and/or milk foam desired, when this device is used as a standalone device, and the device driving the beverage preparation machine when connected to it wirelessly, for the preparation and dispensing of beverage recipes prepared in conjunction with this beverage preparation machine, managing sequences for arriving to a desired beverage recipe, and a beverage preparation machine, the device being wirelessly connectable to the beverage preparation machine, the user selecting a recipe in the device and, depending on the recipe selected, the device works as standalone and produces the said recipe or it drives the beverage preparation machine managing sequences for arriving to a beverage recipe as provided by the user's input.

7. System according to claim 6 wherein the device drives the beverage preparation machine to work sequentially or simultaneously, depending on the recipe selected by the user.

8. System according to claim 6 wherein the device and the beverage preparation machine are connectable by Wi-Fi and/or by Bluetooth.

9. System according to claim 6 wherein the device and/or the beverage preparation machine are connectable to a wireless apparatus by Wi-Fi and/or by Bluetooth.

10. System according to claim 9 wherein the user's input is provided by the wireless apparatus to the device and the device drives the beverage preparation machine for arriving to a beverage recipe as provided by the user's input.

11. System according to claim 6 wherein the beverage preparation machine is a coffee machine.

12. Method for operating a device able to be used as a standalone device or used wirelessly connected to a beverage preparation machine; the device controlling the characteristics of the milk and/or milk foam desired, when this device is used as a standalone device; and the device driving the beverage preparation machine when connected to it wirelessly, for the preparation and dispensing of beverage recipes prepared in conjunction with this beverage preparation machine, managing sequences for arriving to a desired beverage recipe, in order to prepare a beverage or a beverage recipe, the method comprising the steps of:
   the device checks if there is a beverage preparation machine in the surroundings: if there is one, the device connects to the said beverage preparation machine and activates both standalone and multiple-ingredients recipes; if there is no beverage preparation machine, then only standalone recipes are activated;
   the user selects a recipe from the allowable activated ones on the device;
   the device checks if the recipe is a standalone recipe or not; and
   if the recipe is a standalone one, the device produces milk and/or milk foam according to the user's input;
   if the recipe is a multiple-ingredients one, the device drives the beverage preparation machine according to certain sequences in order to arrive to a selected beverage recipe.

13. Method according to claim 12 wherein the device drives the beverage preparation machine to work sequentially or simultaneously, depending on the recipe selected by the user on the device.

14. Method according to claim 12 wherein the device receives information on the user's input by a wireless apparatus to which it is wirelessly connected.

* * * * *